(12) United States Patent
Domyo et al.

(10) Patent No.: US 6,477,848 B1
(45) Date of Patent: Nov. 12, 2002

(54) REFRIGERATING APPARATUS

(75) Inventors: Nobuo Domyo, Osaka (JP); Koichi Kita, Osaka (JP)

(73) Assignee: Daikin Industries, Ltd. (JP)

( * ) Notice: Subject to any disclaimer, the term of this patent is extended or adjusted under 35 U.S.C. 154(b) by 0 days.

(21) Appl. No.: 09/914,588

(22) PCT Filed: Mar. 1, 2000

(86) PCT No.: PCT/JP00/01185

§ 371 (c)(1),
(2), (4) Date: Aug. 30, 2001

(87) PCT Pub. No.: WO00/52396

PCT Pub. Date: Sep. 8, 2000

(30) Foreign Application Priority Data

Mar. 2, 1999 (JP) .............................. 11-054294

(51) Int. Cl.$^7$ ................................. F25B 9/00
(52) U.S. Cl. ........................... 62/114; 252/68
(58) Field of Search ............... 62/114, 467, 468, 62/498; 252/67, 68

(56) References Cited

U.S. PATENT DOCUMENTS 5,499,908 A * 3/1996 Schmitz, III ................ 417/368
5,554,311 A * 9/1996 Katafuchi et al. ............ 252/68

FOREIGN PATENT DOCUMENTS

| JP | 9-208939 | 8/1997 |
|----|----------|--------|
| JP | 10-195426 | 7/1998 |
| WO | WO 98/41803 | 9/1998 |

OTHER PUBLICATIONS

Nippon Reito Kyokai ed. "Jyokyu Hyojun Text Reito Kucho Gijutsu", Jan. 20, 1988, p. 133, right column, line 8 to p. 143, right column, line 26.
International Preliminary Examination Report.

* cited by examiner

*Primary Examiner*—Denise L. Esquivel
*Assistant Examiner*—Malik N. Drake
(74) *Attorney, Agent, or Firm*—Nixon Peabody LLP; Donald R. Studebaker

(57) ABSTRACT

A compressor (11), a four-way switching valve (12), an outdoor heat exchanger (13), an expansion valve (14) and an indoor heat exchanger (15) are sequentially connected together through gas piping (31) and liquid piping (32), thereby forming a refrigerant circuit (10). The refrigerant circuit (10) is filled with an R32 single refrigerant or an R32/R125 mixed refrigerant containing at least 75% by weight of R32. Synthetic oil is used as refrigerating machine oil. When the rated cooling capacity is 5 kW or less, the liquid piping (32) is formed from piping having an inner diameter of less than 4.75 mm.

26 Claims, 6 Drawing Sheets

Fig. 3

|  | R22 | R407C | R410A | R134a | R32/125(75/25wt%) | R32 |
|---|---|---|---|---|---|---|
| ΔT (°C) | 5 | 5 | 5 | 5 | 5 | 5 |
| ΔP (kPa) | 86.13 | 85.86 | 135.05 | 56.92 | 138.66 | 138.49 |
| ΔT/ΔP (°C/kPa) | 0.58 | 0.58 | 0.37 | 0.88 | 0.36 | 0.36 |
| Δh (kJ/kg) | 154.39 | 157.07 | 154.82 | 142.13 | 195.72 | 238.79 |
| ρs (kg/m³) | 22.04 | 21.98 | 31.44 | 15.05 | 26.61 | 22.68 |
| INNER DIAMETER RATIO OF HEAT TRANSFER TUBES | 1.00 | 0.99 | 0.85 | 1.21 | 0.80 | 0.76 |

Fig. 6

|  | | R22 | R407C | R410A | R134a | R32/125 (75/25wt%) | R32 |
|---|---|---|---|---|---|---|---|
| HP | (kPa) | 1899.1 | 2061.1 | 2996.9 | 1285.8 | 3072.32 | 3068.9 |
| LP | (kPa) | 531.14 | 529.71 | 851.71 | 314.63 | 867.93 | 866.52 |
| Δh | (kJ/kg) | 154.39 | 157.07 | 154.82 | 142.13 | 195.72 | 238.79 |
| ρs | (kg/m³) | 22.04 | 21.98 | 31.44 | 15.05 | 26.61 | 22.68 |
| INNER DIAMETER RATIO OF PIPING | | 1.00 | 0.97 | 0.85 | 1.19 | 0.80 | 0.76 |

| REFRIGERANT | GWP |
|---|---|
| R22 | 1500 |
| R407C | 1530 |
| R410A | 1730 |
| R134a | 1300 |
| R32 | 650 |

REFRIGERATING APPARATUS

TECHNICAL FIELD

The present invention relates to a refrigerating apparatus. More particularly, the present invention relates to a refrigerating apparatus using an R32 single refrigerant or an R32 mixed refrigerant.

BACKGROUND ART

Conventionally, the refrigerating apparatuses are known which include a refrigerant circuit including a compressor, a condenser, a decompressing mechanism and an evaporator, wherein the refrigerant circuit forms a refrigerating cycle using an HCFC-based refrigerant such as R22. Among the components of the refrigerant circuit, the compressor particularly plays an important role in compressing the refrigerant. Therefore, refrigerating machine oil is necessary for smooth operation of the compressor.

In the refrigerating apparatuses using an HFC-based refrigerant, synthetic oil such as ether oil or ester oil compatible with the refrigerant is commonly used as refrigerating machine oil.

Problems

As compared to mineral oil used in the conventional refrigerating apparatuses using R22, synthetic oil is more likely to be partially subjected to chemical reaction such as decomposition or polymerization when the air, water or the like is introduced into the refrigerant circuit. As a result, part of the synthetic oil is deposited as sludge in an expansion valve or capillary tube, thereby possibly closing the flow path of the refrigerant circuit.

The air and water are introduced at the time of manufacturing the components of the refrigerant circuit and installing the apparatus at the installation site. In order to reduce the introduced amount thereof, measures must be taken at the time of manufacturing such as changing the manufacturing method or manufacturing process and tightening the quality control. Moreover, at the time of installation, measures must be taken such as improving the achievable vacuum upon vacuuming, extending the vacuuming time, and improving the performance of the vacuum pump.

Accordingly, improved reliability and facilitated handling have been desired for the refrigerating apparatuses using synthetic oil.

The present invention is made in view of the above problems, and it is an object of the present invention to improve reliability of a refrigerating apparatus and facilitate handling thereof.

DISCLOSURE OF THE INVENTION

In order to achieve the aforementioned object, the present invention uses synthetic oil as refrigerating machine oil, and uses a refrigerant having smaller pressure loss than that of a refrigerant such as R22, i.e., an R32 single refrigerant or an R32 mixed refrigerant.

The present invention is made for the following reasons: the R32 single refrigerant or the R32 mixed refrigerant has a greater refrigerating effect than that of R22, R407C or R410A, and therefore the circulation amount of the refrigerant required to obtain the same capability may be smaller than that of a refrigerant such as R22. Accordingly, the R32 single refrigerant or the R32 mixed refrigerant has smaller pressure loss than that of a refrigerant such as R22 when flowing through a flow path with the same diameter.

Refrigerant piping includes liquid piping. For example, the liquid piping is the piping provided between the outlet of the condenser to the inlet of the evaporator. This liquid piping will not cause degradation in performance of the apparatus if increase in pressure loss, if any, is within the control range of the decompressing mechanism (capillary tube, expansion valve and the like). When the R32 single refrigerant or the R32 mixed refrigerant is used, the difference in pressure in the refrigerant circuit is at most about 1.6 times that in the case where R22 is used. The allowable range of the pressure loss of the refrigerant is thus increased accordingly. Therefore, the use of the R32 single registrant or the R32 mixed registrant enables reduction in the diameter of the liquid piping as compared to the conventional examples without degrading the performance of the apparatus.

The refrigerant piping also includes discharge piping and intake piping. For example, the discharge piping is the piping provided between the discharge side of the compressor and the inlet of the condenser, and the intake piping is the piping provided between the outlet of the evaporator and the intake side of the compressor. The pressure loss in the discharge piping and the intake piping significantly affects the performance of the apparatus. However, the use of the R32 single refrigerant or the R32 mixed refrigerant reduces the pressure loss as compared to the conventional examples. Accordingly, even if the discharge piping and the intake piping have a reduced diameter, the use of the R32 single refrigerant or the R32 mixed refrigerant enables the performance of the apparatus to be kept equivalent to that in the conventional examples. Moreover, the R32 single refrigerant or the R32 mixed refrigerant enables slight reduction in pipe diameter while allowing for higher performance than that of the conventional apparatuses.

Regarding a heat exchanger, the difference in saturation temperature corresponding to the pressure loss of the refrigerant is an important factor that affects the performance thereof. The R32 single refrigerant or the R32 mixed refrigerant has small pressure loss. Therefore, the difference in saturation temperature can be made equal to that of the conventional examples even when a heat transfer tube of the heat exchanger has a reduced diameter. Moreover, the R32 single refrigerant or the R32 mixed refrigerant has a higher heat transfer coefficient than that of the conventional examples. Therefore, the heat-exchange capability can be retained at a high level even when the heat transfer tube has a reduced diameter.

From the foregoing description, the inventor found that the use of the R32 single refrigerant or the R32 mixed refrigerant as well as reduction in diameter of the refrigerant piping and the heat transfer tube of the heat exchanger for the purpose of reducing the internal volume of the refrigerant circuit would not be problematic in terms of the performance. The amount of air and water introduced into the refrigerant circuit is increased in proportion to the internal volume of the refrigerant circuit. In the present invention, the internal volume of the refrigerant circuit is reduced by using the R32 single refrigerant or the R32 mixed refrigerant, whereby the amount of air and water introduced into the refrigerant circuit is reduced, preventing degradation of synthetic oil.

More specifically, according to one aspect of the invention, a refrigerating apparatus uses a single refrigerant of R32 or a mixed refrigerant containing at least 75% by weight of R32, and uses synthetic oil as refrigerating machine oil.

According to another aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less. Liquid piping (32) of the refrigerant circuit (10) is formed from piping having an inner diameter of less than 4.75 mm.

According to still another aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less. Liquid piping (32) of the refrigerant circuit (10) is formed from piping having an inner diameter of 3.2 mm to 4.2 mm.

According to yet another aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less. Liquid piping (32) of the refrigerant circuit (10) is formed from piping having an inner diameter of 3.5 mm to 3.9 mm.

According to a further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less. Liquid piping (32) of the refrigerant circuit (10) is formed from piping having an inner diameter of 3.6 mm to 3.8 mm.

According to a still further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 18 kW. Liquid piping (32) of the refrigerant circuit (10) is formed from piping having an inner diameter of less than 7.92 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 18 kW and equal to or less than 22.4 kW. Liquid piping (32) of the refrigerant circuit (10) is formed from piping having an inner diameter of less than 11.1 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kw and equal to or less than 22.4 kW. Liquid piping (32) of the refrigerant circuit (10) is formed from piping having an inner diameter of 5.4 mm to 7.0 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 22.4 kW. Liquid piping (32) of the refrigerant circuit (10) is formed from piping having an inner diameter of 5.7 mm to 6.7 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kw and equal to or less than 22.4 kW. Liquid piping (32) of the refrigerant circuit (10) is formed from piping having an inner diameter of 6.0 mm to 6.4 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kw. Liquid piping (32) of the refrigerant circuit (10) is formed from piping having an inner diameter of less than 13.88 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW. Liquid piping (32) of the refrigerant circuit (10) is formed from piping having an inner diameter of 7.5 mm to 9.8 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and. includes a compressor (11) using synthetic oil as refrigerating machine oil, the refrigerating apparatus being designed to have a rated cooling capacity of more than 22.4 kW. Liquid piping (32) of the refrigerant circuit (10) is formed from piping having an inner diameter of 7.8 mm to 9.5 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW. Liquid piping (32) of the refrigerant circuit (10) is formed from piping having an inner diameter of 8.1 mm to 9.1 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 3.2 kW or less. Gas piping (31) of the refrigerant circuit (10) is formed from piping having an inner diameter of less than 7.92 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 3.2 kW and equal to or less than 5 kW. Gas piping (31) of the refrigerant circuit (10) is formed from piping having an inner diameter of less than 11.1 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 9 kW. Gas piping (31) of the refrigerant circuit (10) is formed from piping having an inner diameter of less than 13.88 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 9 kW and equal to or less than 18 kW. Gas piping (31) of the refrigerant circuit (10) is formed from piping having an inner diameter of less than 17.05 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 18 kW and equal to or less than 22.4 kW. Gas piping (31) of the refrigerant circuit (10) is formed from piping having an inner diameter of less than 23.4 mm.

According to a yet further aspect of the invention, a refrigerating apparatus includes a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW. Gas piping (31) of the refrigerant circuit (10) is formed from piping having an inner diameter of less than 26.18 mm.

According to a yet further aspect of the invention, a refrigerating apparatus includes a refrigerant circuit (10) that includes a compressor (11) using synthetic oil as refrigerating machine oil and an indoor heat exchanger (15), and forms a refrigerating cycle using as a refrigerant a single refrigerant of R32 or a mixed refrigerant containing at least 75% by weight of R32. A heat transfer tube of the indoor heat exchanger (15) is formed from a heat transfer tube having an inner diameter of less than 5.87 mm.

According to a yet further aspect of the invention, a refrigerating apparatus includes a refrigerant circuit (10) that includes a compressor (11) using synthetic oil as refrigerating machine oil and an outdoor heat exchanger (13), and forms a refrigerating cycle using as a refrigerant a single refrigerant of R32 or a mixed refrigerant containing at least 75% by weight of R32. A heat transfer tube of the outdoor heat exchanger (13) is formed from a heat transfer tube having an inner diameter of less than 6.89 mm.

According to a yet further aspect of the invention, a refrigerating apparatus includes a refrigerant circuit (10) that includes a compressor (11) using synthetic oil as refrigerating machine oil and an outdoor heat exchanger (13), and forms a refrigerating cycle using as a refrigerant a single refrigerant of R32 or a mixed refrigerant containing at least 75% by weight of R32. A heat transfer tube of the outdoor heat exchanger (13) is formed from a heat transfer tube having an inner diameter of less than 7.99 mm.

The liquid piping (32) may be liquid connection piping connecting an indoor unit (17) and an outdoor unit (16) to each other.

The gas piping (31) may be gas connection piping connecting an indoor unit (17) and an outdoor unit (16) to each other.

The mixed refrigerant is preferably an R32/R125 mixed refrigerant.

The refrigerant may be a single refrigerant of R32.

Effects of the Invention

According to the present invention, the internal volume of the refrigerant circuit (10) can be reduced, and therefore the amount of air, water or the like that is introduced into the refrigerant circuit (10) can be reduced, enabling improvement in reliability of the apparatus using synthetic oil.

Moreover, since the water or the like is less likely to be introduced into the refrigerant circuit (10), manufacturing and installation can be easily managed, facilitating manufacturing and installation.

BRIEF DESCRIPTION OF THE DRAWINGS

FIG. 3 is a table showing the calculation result of the inner diameter ratio of heat transfer tubes;

FIG. 6 is a table showing the calculation result of the inner diameter ratio of liquid piping;

BEST MODE FOR CARRYING OUT THE INVENTION

Hereinafter, an embodiment of the present invention will be described in conjunction with the accompanying drawings.

Structure of Air-Conditioning Apparatus

Figure 1:
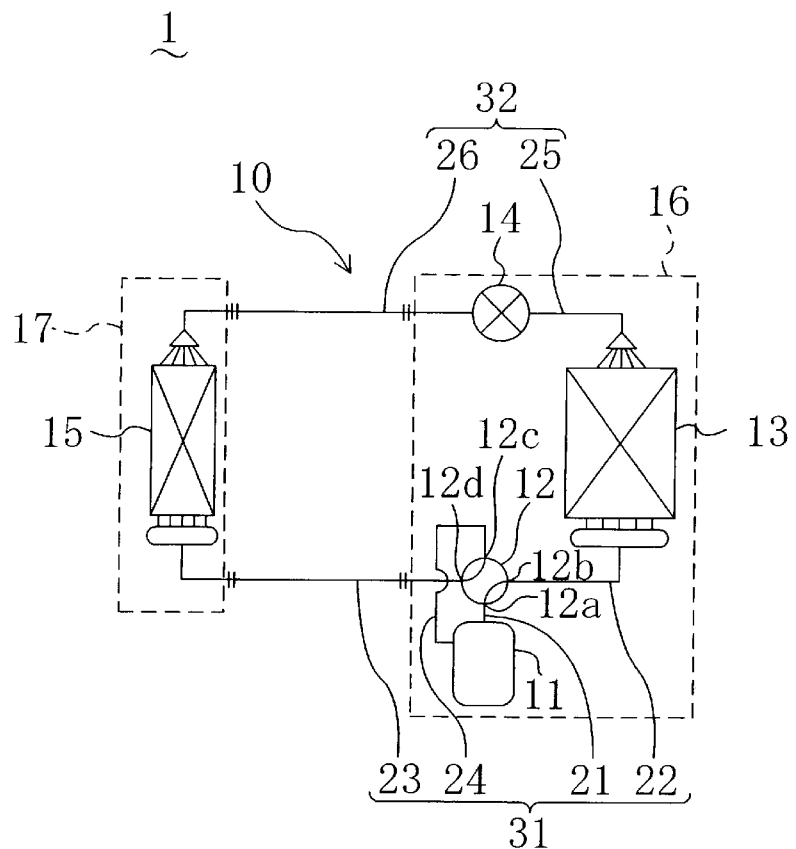
FIG. 1 is a refrigerant circuit diagram of an air-conditioning apparatus.

As shown in FIG. 1, a refrigerating apparatus according to the present embodiment is an air-conditioning apparatus (1)

having an indoor unit (17) and an outdoor unit (16) connected to each other. A refrigerant circuit (10) of the air-conditioning apparatus (1) uses as a refrigerant a single refrigerant of R32 (hereinafter, referred to as R32 single refrigerant) or a mixed refrigerant of R32 in the range of 75% by weight to less than 100% by weight and R125 (R32-rich mixed refrigerant; hereinafter, referred to as R32/R125 mixed refrigerant).

The refrigerant circuit (10) is a refrigerant circuit forming a vapor-compression refrigerating cycle, wherein a compressor (11), a four-way switching valve (12), an outdoor heat exchanger (13), an expansion valve (14) serving as an expansion mechanism, and an indoor heat exchanger (15) are sequentially connected together through refrigerant piping, i.e., though gas piping (31) and liquid piping (32).

More specifically, the discharge side of the compressor (11) and a first port (12a) of the four-way switching valve (12) are connected to each other through a first gas pipe (21). A second port (12b) of the four-way switching valve (12) and the outdoor heat exchanger (13) are connected to each other through a second gas pipe (22). The outdoor heat exchanger (13) and the expansion valve (14) are connected to each other through a first liquid pipe (25). The expansion valve (14) and the indoor heat exchanger (15) are connected to each other through a second liquid pipe (26). The indoor heat exchanger (15) and a third port (12c) of the four-way switching valve (12) are connected to each other through a third gas pipe (23). A fourth port (12d) of the four-way switching valve (12) and the intake side of the compressor (11) are connected to each other through a fourth gas pipe (24).

The compressor (11), first gas pipe (21), four-way switching valve (12), second gas pipe (22), outdoor heat exchanger (13), first liquid pipe (25), expansion valve (14) and fourth gas pipe (24) are accommodated in the outdoor unit (16) together with a not-shown outdoor blower. On the other hand, the indoor heat exchanger (15) is accommodated in the indoor unit (17) together with a not-shown indoor blower. A part of the second liquid pipe (22) and a part of the third gas pipe (23) form so-called connection piping for connecting the outdoor unit (16) and the indoor unit (17) together.

The compressor (11) uses synthetic oil (e.g., ether oil or ester oil) as refrigerating machine oil.

Structure of Heat Exchanger

Since the R32 single refrigerant or the R32/R125 mixed refrigerant has a greater refrigerating effect per unit volume than that of R22, the circulation amount of the R32 single refrigerant or the R32/R125 mixed refrigerant required to obtain prescribed capability is smaller than that of R22. Accordingly, provided that the heat transfer tube of the heat exchanger has a fixed inner diameter, the R32 single refrigerant or the R32/R125 mixed refrigerant has a smaller pressure loss within the tube than that of R22 due to the smaller circulation amount.

In general, as the inner diameter of the heat transfer tube of the heat exchanger is reduced, the overall performance of the apparatus is reduced due to the reduced heat transfer area and increased refrigerant pressure loss. However, the use of the R32 single refrigerant or the R32/R125 mixed refrigerant would enable the performance equivalent to or greater than that of R22 to be obtained as a whole even if the pressure loss within the tube is increased approximately to the degree corresponding to that of R22. This is because the R32 single refrigerant and the R32/R125 mixed refrigerant have a larger heat transfer coefficient within the heat transfer tube than that of R22.

The outdoor heat exchanger (13) is a part that retains the largest amount of refrigerant in the refrigerant circuit (10). Therefore, reducing the diameter of the heat transfer tube of the outdoor heat exchanger (13) enables effective reduction in the charging amount of the refrigerant. Moreover, reduction in the diameter of the heat transfer tube results in reduced internal volume of the refrigerant circuit (10). Reduction in the diameter of the heat transfer tube also results in reduced size of the outdoor heat exchanger (13) and the indoor heat exchanger (15), facilitating implementation of compact outdoor unit (16) and indoor unit (17).

Therefore, in this air-conditioning apparatus (1), the diameter of the respective heat transfer tubes of the outdoor heat exchanger (13) and the indoor heat exchanger (15) is reduced to such a degree that the pressure loss within the tube becomes equal to that of R22. More specifically, in this air-conditioning apparatus (1), the inner diameter of the respective heat transfer tubes of the outdoor heat exchanger (13) and the indoor heat exchanger (15) is set in view of the variation in saturation temperature of the refrigerant which corresponds to the pressure loss in the heat transfer tube, that is, such that this temperature variation becomes equal to that of R22.

Basic Principles of Heat Transfer Tube Structure

Hereinafter, the basic principles of the heat transfer tubes of the outdoor heat exchanger (13) and the indoor heat exchanger (15) will be described specifically.

Figure 2:
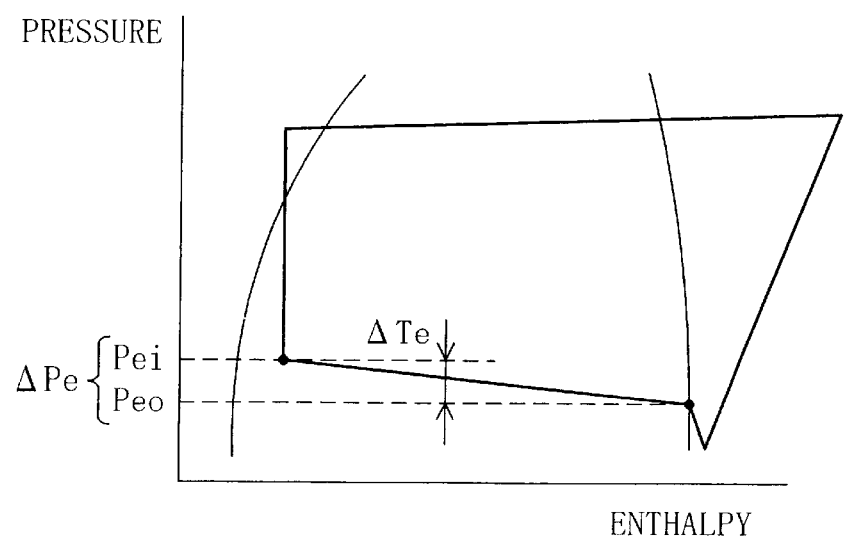
FIG. 2 is a Mollier chart.

As shown in FIG. 2, the respective heat transfer tubes of the outdoor heat exchanger (13) and the indoor heat exchanger (15) are herein set such that the variation in saturation temperature $\Delta Te$ corresponding to the pressure loss of the evaporating refrigerant becomes equal to that of R22 in the conventional apparatus. More specifically, $$\Delta Te = \text{Const.} \tag{1}$$

It is herein assumed that
 $\Delta P$: pressure loss in a pipe (kPa);
 L: pipe length (m);
 G: circulation amount of the refrigerant (kg/s);
 A: cross-sectional area of the flow path (m$^2$);
 $\lambda$: loss factor;
 d: inner diameter of the pipe (m); and
 $\rho s$: intake refrigerant density of the compressor (kg/m$^3$).
The variation in saturation temperature $\Delta Te$ is given by the following equation:

$$\Delta Te = \left\{\frac{\Delta T}{\Delta P}\right\} \times \Delta Pe. \tag{2}$$

The pressure loss $\Delta P$ is calculated using the following equation of the friction loss of a circular pipe:

$$\Delta P = \lambda \cdot \frac{L}{d} \cdot \frac{G^2}{2 \cdot \rho s \cdot A^2}. \tag{3}$$

Provided that the cooling capacity Q=G×$\Delta h$ is fixed, $$\Delta P \propto \frac{G^2}{\rho s \cdot d^5} \propto (\Delta h^2 \cdot \rho s \cdot d^5)^{-1} \tag{4}$$

where $\Delta h$: refrigerating effect (kJ/kg).

According to the above equations (2) and (4), the pressure loss ΔP is given by the following equation:

$$\Delta Te \propto \left\{\frac{\Delta T}{\Delta P}\right\} \times (\Delta h^2 \cdot \rho s \cdot d^5)^{-1}. \tag{5}$$

Accordingly, based on the above equations (1) and (5) as well as physical property values of R22 and R32, the inner diameter ratio of the R32 heat transfer tube to the R22 heat transfer tube, i.e., the reduction ratio of the diameter of the former heat transfer tube with respect to that of the latter heat transfer tube, can be obtained according to the following equation:

$$\left\{\frac{\Delta T}{\Delta P}\right\}_{22} (\Delta h_{22}^2 \cdot \rho s_{22} \cdot d_{22}^5)^{-1} = \left\{\frac{\Delta T}{\Delta P}\right\}_{32} \times \tag{6}$$

$$(\Delta h_{32}^2 \cdot \rho s_{32} \cdot d_{32}^5)^{-1} \frac{d_{32}}{d_{22}} \left[\left(\frac{\Delta h_{32}}{\Delta h_{22}}\right)^2 \times \frac{\rho s_{32}}{\rho s_{22}} \times \left(\frac{\left\{\frac{\Delta T}{\Delta P}\right\}_{32}}{\left\{\frac{\Delta T}{\Delta P}\right\}_{22}}\right)^{-1}\right]^{-1/5}.$$

FIG. 3 shows the calculation result obtained by substituting the physical property values for the equation (6). Note that, in this calculation, it is assumed that the evaporating temperature Te is 2° C. and the condensing temperature Tc is 49° C. Moreover, the super heat SH at the outlet of the evaporator is 5 deg and the subcool SC at the outlet of the condenser is 5 deg.

It was found from the above calculation result that the diameter of the heat transfer tube for the R32 single refrigerant is reduced to about 0.76 times that of the heat transfer tube for R22. It was also found that the diameter of the heat transfer tube for the R32/R125 mixed refrigerant can be reduced to about 0.76 times: to about 0.8 times that of the heat transfer tube for R22. Note that the same calculation was performed for other alternative refrigerants just for reference. However, it was found that the diameter is not reduced so much as that in the case of R32 (see FIG. 3).

Based on such principles, this air-conditioning apparatus (1) employs the heat transfer tubes having the following inner diameters for comparison with the heat transfer tube for R22:

When the R32 single refrigerant is used, the heat transfer tube of the indoor heat exchanger (15) is formed from a heat transfer tube having an inner diameter of 4.7 mm to 5.9 mm, and the heat transfer tube of the outdoor heat exchanger (13) is formed from a heat transfer tube having an inner diameter of 5.4 mm to 6.7 mm.

On the other hand, when the R32/R125 mixed refrigerant is used, the heat transfer tube of the indoor heat exchanger (15) is formed from a heat transfer tube having an inner diameter of 4.7 mm to 6.2 mm, and the heat transfer tube of the outdoor heat exchanger (13) is formed from a heat transfer tube having an inner diameter of 5.4 mm to 7.1 mm.

If the inner diameter of each heat transfer tube is smaller than the aforementioned range, the charging amount of the refrigerant is further reduced, but the pressure loss of the refrigerant is excessively increased. On the other hand, if the inner diameter of each heat transfer tube is larger than the aforementioned range, the pressure loss of the refrigerant is reduced and the efficiency of the apparatus is improved, but the effects of R32 such as reduction in the charging amount of the refrigerant are reduced.

In the present embodiment, in order to balance these factors, the inner diameter of each of the respective heat transfer tubes of the outdoor heat exchanger (13) and the indoor heat exchanger (15) is set within the aforementioned range.

It should be appreciated that, depending on the conditions under which the apparatus is used or the like, each of the aforementioned ranges may be narrowed in order to obtain the characteristics of R32 in a more noticeable manner.

For example, when the R32 single refrigerant is used, the heat transfer tube of the indoor heat exchanger (15) may be formed from a heat transfer tube having an inner diameter of 4.9 mm to 5.7 mm, and the heat transfer tube of the outdoor heat exchanger (13) may be formed from a heat transfer tube having an inner diameter of 5.6 mm to 6.5 mm.

Alternatively, when the R32 single refrigerant is used, the heat transfer tube of the indoor heat exchanger (15) may be formed from a heat transfer tube having an inner diameter of 5.1 mm to 5.5 mm, and the heat transfer tube of the outdoor heat exchanger (13) may be formed from a heat transfer tube having an inner diameter of 5.8 mm to 6.3 mm. Moreover, when the R32/152 mixed refrigerant is used, a heat transfer tube of the indoor heat exchanger (15) may be formed from a heat transfer tube having an inner diameter of 4.9 mm to 6.0 mm, and the heat transfer tube of the outdoor heat exchanger (13) may be formed from a heat transfer tube having an inner diameter of 5.6 mm to 6.9 mm.

Alternatively, when the R32/152 mixed refrigerant is used, the heat transfer tube of the indoor heat exchanger (15) may be formed from a heat transfer tube having an inner diameter of 5.2 mm to 5.7 mm, and the heat transfer tube of the outdoor heat exchanger (13) may be formed from a heat transfer tube having an inner diameter of 5.9 mm to 6.6 mm.

Figure 4:
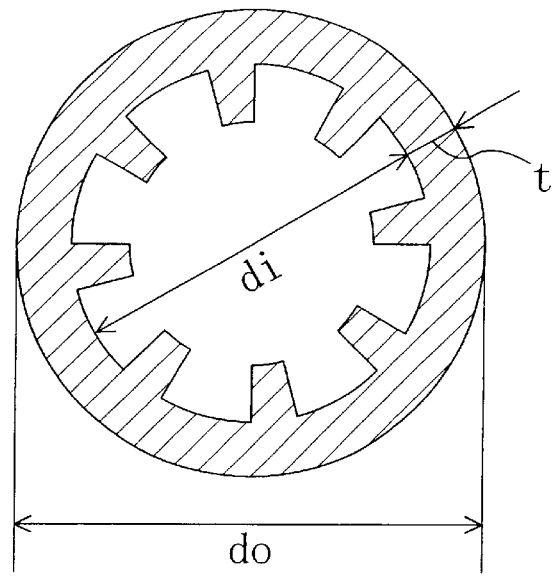
FIG. 4 is a cross-sectional view of a grooved tube.

Note that, in the case of a tube having a smooth inner surface, the inner diameter of the heat transfer tube herein refers to the inner diameter of the expanded tube. As shown in FIG. 4, in the case of an internally grooved tube, the inner diameter of the heat transfer tube refers to the outer diameter of the expanded tube minus twice the thickness at the bottom of the tube, i.e., the inner diameter di=do−2t.

Various heat transfer tubes such as copper tube or aluminum tube can be used as the heat transfer tubes. Each of the outdoor heat exchanger (13) and indoor heat exchanger (15) of the present embodiment is a plate-fin tube heat exchanger formed from a copper tube and an aluminum fin as a kind of air heat exchanger for exchanging heat with the air. Therefore, a copper tube is used as the heat transfer tube.

Structure of Refrigerant Piping

In this air-conditioning apparatus (1), not only the respective heat transfer tubes of the heat exchangers (13, 15) but also the refrigerant piping of the refrigerant circuit (10) are reduced in diameter in order to reduce the internal volume of the refrigerant circuit (10).

As described above, when the R32 single refrigerant or the R32/R125 mixed refrigerant is directly used in the refrigerant piping for R22, the pressure loss of the refrigerant is reduced. Accordingly, even if the inner diameter of the liquid piping (32) of the refrigerant circuit (10) is reduced so as to increase the pressure loss within the tube to the same level as that in the case where R22 is used, the performance of the apparatus is kept equivalent to that of the conventional examples. In this air-conditioning apparatus (1), the diameter of the liquid piping (32) is reduced to increase the pressure loss within the tube to the level corresponding to that of R22, so that the internal volume of the refrigerant circuit (10) is reduced while maintaining the performance of the apparatus.

On the other hand, in the present embodiment, the gas piping (31) is the same as the conventional gas piping for R22. However, in order to reduce the internal volume of the refrigerant circuit (10), it is more preferable to reduce the diameter of the gas piping (31) as well.

Basic Principles of Refrigerant Piping Structure

Hereinafter, the basic principles of the liquid piping (32) will be described.

Figure 5:
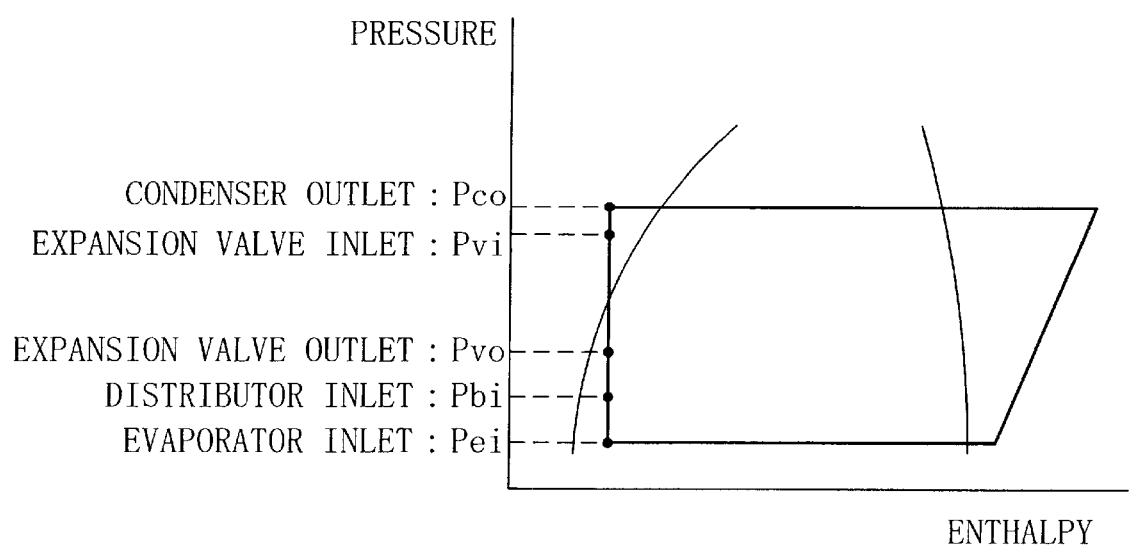
FIG. 5 is a Mollier chart.

The liquid piping (32) is herein designed such that the rate of the pressure loss in the liquid piping (32) to the pressure drop of the refrigerant from the outlet of the condenser to the inlet of the evaporator becomes equal to that in the case of R22. In other words, the following equation is obtained using the reference characters in FIG. 5:

$$\frac{(Pco - Pvi) + (Pvo - Pbi)}{(Pco - Pei)} = Const.. \quad (7)$$

It is herein assumed that

ΔP: pressure loss in a pipe (kPa);

L: pipe length (m);

G: circulation amount of the refrigerant (kg/s);

A: cross-sectional area of the flow path (m²);

λ: loss factor;

d: inner diameter of the pipe (m); and

ρs: intake refrigerant density of the compressor (kg/m³).

Each term in the numerator of the above equation (7) is calculated using the following equation of the friction loss of a circular pipe:

$$\Delta P = \lambda \cdot \frac{L}{d} \cdot \frac{G^2}{2 \cdot \rho s \cdot A^2}. \quad (8)$$

Provided that the capacity Q=G×Δh is fixed, the following equation is derived from the above equation (8):

$$\Delta P \propto \frac{G^2}{\rho s \cdot d^5} \propto (\Delta h^2 \cdot \rho s \cdot d^5)^{-1} \quad (9)$$

where Δh: refrigerating effect (kJ/kg).

Accordingly, the following equation is derived:

$$(Pco-Pvi)+(Pvo-Pbi) \, (\Delta h^2 \cdot \rho s \cdot d^5)^{-1} \quad (10).$$

The following equation is derived from the above equations (7) and (10):

$$\frac{(Pco - Pvi) + (Pvo - Pbi)}{(Pco - Pei)} \propto \frac{(\Delta h^2 \cdot \rho s \cdot d^5)^{-1}}{(HP - LP)}. \quad (11)$$

Accordingly, based on the above equations (7) and (11) as well as physical property values of R22 and R32, the reduction ratio of the diameter of the R32 liquid piping (32) with respect to that of the R22 liquid piping can be obtained according to the following equation:

$$\frac{(\Delta h_{22}^2 \cdot \rho s_{22} \cdot d_{22}^5)^{-1}}{(HP_{22} - LP_{22})} = \quad (12)$$

$$\frac{(\Delta h_{32}^2 \cdot \rho s_{32} \cdot d_{32}^5)^{-1}}{(HP_{32} - LP_{32})} \frac{d_{32}}{d_{22}} = \left( \left( \frac{\Delta h_{32}}{\Delta h_{32}} \right)^2 \times \frac{\rho s_{32}}{\rho s_{22}} \times \frac{(HP_{32} - LP_{32})}{(HP_{22} - LP_{22})} \right)^{-1/5}.$$

FIG. 6 shows the calculation result obtained by substituting the physical property values for the equation (12). Note that, in this calculation as well, it is assumed that the evaporating temperature Te is 2° C., the condensing temperature Tc is 49° C., the super heat SH is 5 deg and the subcool SC is 5 deg.

It was found from the above calculation result that the diameter of the liquid piping (32) for the R32 single refrigerant can be reduced to about 0.76 times that of the liquid piping for R22. It was also found that, for the R32/R125 mixed refrigerant as well, the diameter can be reduced to about 0.76 times to about 0.8 times that of the liquid piping for R22 provided that the R32/R125 mixed refrigerant contains at least 75% by weight of R32. Note that the same calculation was performed for other alternative refrigerants just for reference. However, it was found that the diameter is not reduced so much as that in the case of R32 (see FIG. 6).

Figure 7:
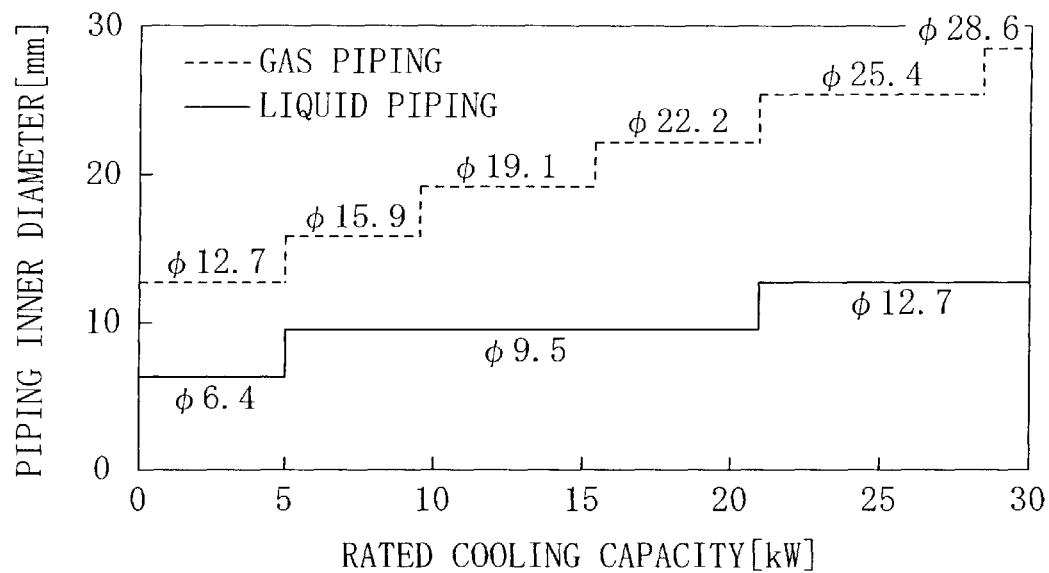
FIG. 7 is a diagram showing the respective diameters of gas piping and liquid piping for R22 according to the rated cooling capacity.

FIG. 7 is a diagram showing the respective diameters (inner diameters) of the gas piping and the liquid piping in the conventional apparatus using R22, according to the rated cooling capacity.

According to the rated cooling capacity, this air-conditioning apparatus (1) uses the gas piping (31) having the same diameter as that of the gas piping for R22, but uses the liquid piping (32) having a smaller diameter than that of the liquid piping for R22.

Figure 8:
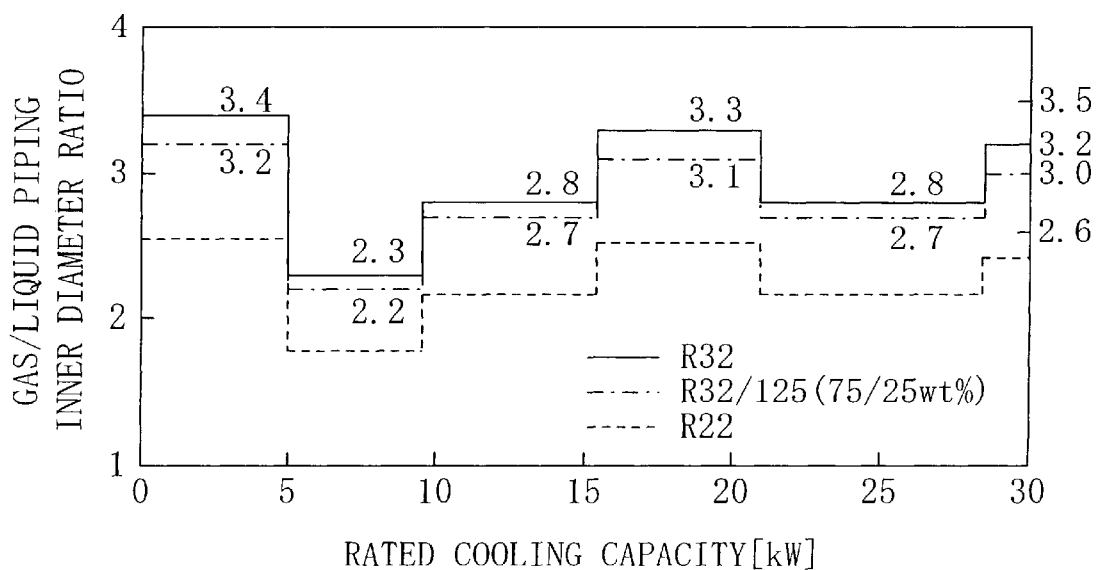
FIG. 8 is a diagram showing the diameter ratio of gas piping to liquid piping according to the rated cooling capacity.

FIG. 8 is a diagram showing the ratio of the inner diameter dg of the gas piping to the inner diameter dl of the liquid piping, that is, the inner diameter ratio (=gas piping inner diameter dg/liquid piping inner diameter dl). This air-conditioning apparatus (1) uses the gas piping (31) and the liquid piping (32) having the following inner diameter ratio according to the rated cooling capacity:

When the rated cooling capacity is larger than 5 kW and equal to or less than 9 kW, the gas piping (31) and the liquid piping (32) having the inner diameter ratio of 2.1 to 3.5 are used. When the rated cooling capacity is 5 kW or less, or larger than 9 kW, the gas piping (31) and the liquid piping. (32) having the inner diameter ratio of 2.6 to 3.5 are used.

When the rated cooling capacity is 5 kW or less, piping having an inner diameter of 3.2 mm to 4.2 mm is used as the liquid piping (32). When the rated cooling capacity is larger than 5 kW and less than 22.4 kW, piping having an inner diameter of 5.4 mm to 7.0 mm is used as the liquid piping (32). When the rated cooling capacity is 22.4 kW or more, piping having an inner diameter of 7.5 mm to 9.8 mm is used as the liquid piping (32).

If the inner diameter ratio or the inner diameter of the liquid piping (32) is smaller than the aforementioned range, the charging amount of the refrigerant is further reduced, but the performance of the apparatus is degraded. On the other hand, if the inner diameter ratio or the inner diameter of the liquid piping (32) is larger than the aforementioned range, the pressure loss of the refrigerant is reduced and the performance of the apparatus is improved, but the effect of reduction in the charging amount of the refrigerant is reduced.

In the present embodiment, in order to enable sufficient reduction in the charging amount of the refrigerant while maintaining the performance of the apparatus, the gas piping (31) and the liquid piping (32) are set within the aforementioned range.

It should be appreciated that, depending on the conditions under which the apparatus is used or the like, each of the aforementioned ranges may be narrowed in order to make effective use of the characteristics of R32.

For example, when the rated cooling capacity is larger than 5 kW and equal to or less than 9 kW, the inner diameter ratio may be in the range of 2.4 to 3.2. When the rated cooling capacity is 5 kW or less, or larger than 9 kW, the inner diameter ratio may be in the: range of 2.8 to 3.3.

Alternatively, when the rated cooling capacity is larger than 5 kW and equal to or less than 9 kW, the inner diameter ratio may be in the range of 2.6 to 3.0. When the rated cooling capacity is 5 kW or less, or larger than 9 kW, the inner diameter ratio may be in the range of 2.9 to 3.1.

When the rated cooling capacity is 5 kW or less, the inner diameter of the liquid piping (32) may be in the range of 3.5 mm to 3.9 mm. When the rated cooling capacity is larger than 5 kW and less than 22.4 kW, the inner diameter of the liquid piping (32) may be in the range of 5.7 mm to 6.7 mm. When the rated cooling capacity is 22.4 kW or more, the inner diameter of the liquid piping (32) may be in the range of 7.8 mm to 9.5 mm.

Alternatively, when the rated cooling capacity is 5 kW or less, the inner diameter of the liquid piping (32) may be in the range of 3.6 mm to 3.8 mm. When the rated cooling capacity is larger than 5 kW and less than 22.4 kW, the inner diameter of the liquid piping (32) may be in the range of 6.0 mm to 6.4 mm. When the rated cooling capacity is 22.4 kW or more, the inner diameter of the liquid piping (32) may be in the range of 8.1 mm to 9.1 mm.

Conventionally, copper pipes are commonly used as refrigerant piping because of its low costs and easy handling. Since various standardized products are present regarding the copper pipes, the use of the existing standardized product enables reduction in costs of the refrigerant piping (31, 32). Accordingly, in order to reduce the costs of the apparatus, it is preferable to form both the liquid piping (32) and the gas piping (31) only from the standardized products combined to have the aforementioned inner diameter ratio.

Figures 9, 10:
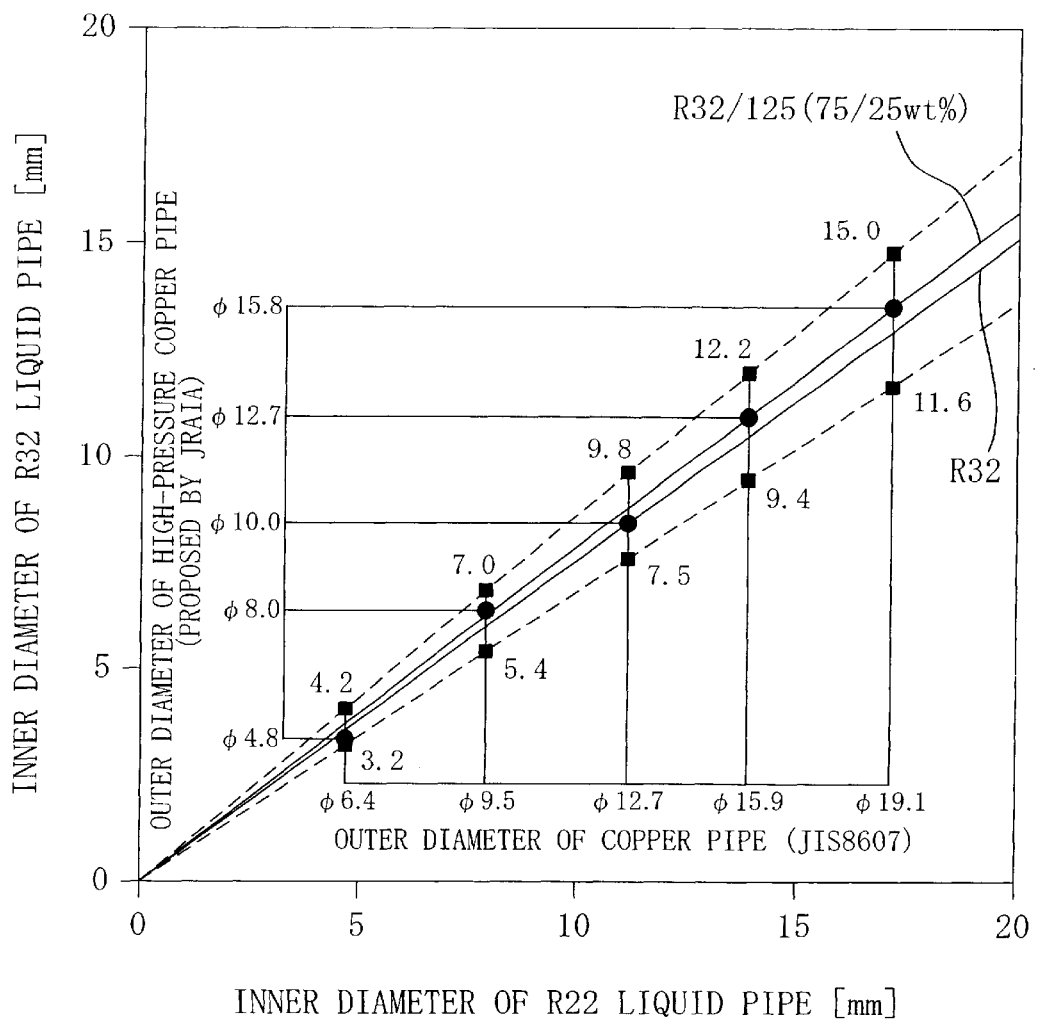
FIG. 9 is a diagram showing the relation between a copper pipe for R22 and a copper pipe for R32.
FIG. 10 is a table showing a global warming coefficient.

FIG. 9 is a diagram showing comparison between the specification of the copper pipe for R22 (JISB8607) and the specification of the pipe for high pressure for R32 proposed by the Japan Refrigeration and Air Conditioning Industry Association (JRAIA).

The optimal inner diameter ratio obtained from the above calculation result is 0.76 for the R32 single refrigerant, and 0.80 for the R32/R125 mixed refrigerant containing 75% by weight of R32. It was found from FIG. 9 that the inner diameter ratio within ±10% of. the optimal inner diameter ratio can be easily implemented by combining the standardized products.

For example, in the case where standardized piping of □ 9.5 mm has been used as the piping for R22, standardized piping of □8.0 mm can be used as the piping for R32. Thus, the present embodiment can be easily implemented by combining the standardized products.

Operation of Air-Conditioning Apparatus (1)

The operation of the air-conditioning apparatus (1) will now be described based on the refrigerant circulating operation in the refrigerant circuit (10).

In the cooling operation, the four-way switching valve (12) is set as shown by the solid line in FIG. 1. More specifically, the four-way switching valve (12) is set such that the first and second ports (12a) and (12b) communicate with each other and the third and fourth ports (12c) and (12d) communicate with each other.

In this state, a gas refrigerant discharged from the compressor (11) flows through the first gas pipe (21), four-way switching valve (12) and second gas pipe (22), and condenses in the outdoor heat exchanger (13). The liquid refrigerant leaving the outdoor heat exchanger (13) flows through the first liquid pipe (25), and is decompressed in the expansion valve (14) into a gas-liquid two-phase refrigerant. The two-phase refrigerant leaving the expansion valve (14) flows through the second liquid pipe (26), and evaporates as a result of heat exchange with the room air in the indoor heat exchanger (15), thereby cooling the room air. The gas refrigerant leaving the indoor heat exchanger (15) flows through the third gas pipe (23), four-way switching valve (12) and fourth gas pipe (24), and is introduced into the compressor (11).

On the other hand, in the heating operation, the four-way switch valve (12) is set as shown by the dashed line in FIG. 1. More specifically, the four-way switching valve (12) is set such that the first and fourth ports (12a) and (12d) communicate with each other and the second and third ports. (12b) and (12c) communicate with each other.

In this state, a gas refrigerant discharged from the compressor (11) flows through the first gas pipe (21), four-way switching valve (12) and third gas pipe (23) into the indoor heat exchanger (15). The refrigerant entering the indoor heat exchanger (15) condenses as a result of heat exchange with the room air, thereby heating the room air. The liquid refrigerant leaving the indoor heat exchanger (15) flows through the second liquid pipe (26), and is decompressed in the expansion valve (14) into a gas-liquid two-phase refrigerant. The two-phase refrigerant leaving the expansion valve (14) flows through the first liquid pipe (25), and evaporates in the outdoor heat exchanger (13). The gas refrigerant leaving the outdoor heat exchanger (13) flows through the second gas pipe (22), four-way switching valve (12) and fourth gas pipe (24), and is introduced into the compressor (11).

Effects of the Embodiment

In the present embodiment, the R32 single refrigerant or the R32/R125 mixed refrigerant is used as a refrigerant, and the respective heat transfer tubes of the outdoor heat exchanger (13) and the indoor heat exchanger (15) as well as the liquid piping (32) each have a reduced diameter. Therefore, according to the present embodiment, the internal volume of the refrigerant circuit (10) can be reduced while maintaining the performance of the apparatus, thereby enabling suppression of introduction of the water or the like into the refrigerant circuit (10). As a result, although the synthetic oil is used as refrigerating machine oil, closing of the circuit due to deposition of sludge is less likely to occur, improving reliability of the apparatus. Moreover, since the water or the like is less likely to be introduced into the refrigerant circuit (10), quality control at the time of manufacturing and installation can be relaxed.

Moreover, due to the reduced internal volume of the refrigerant circuit (10), the charging amount of the refrigerant can be reduced, enabling reduction in the global warming effects. Furthermore, the reduced diameter of the heat transfer tubes allows for reduction in costs and implementation of compact outdoor heat exchanger (13) and indoor heat exchanger (15), and thus allows for reduction in size of the indoor unit (17) and the outdoor unit (16).

Other Embodiments

It should be understood that both the gas piping (31) and the liquid piping (32) may have a reduced diameter in the present invention. However, the internal volume of the refrigerant circuit (10) can also be reduced by reducing only the diameter of the gas piping (31).

Not all of the first, second, third and fourth gas pipes (21), (22), (23) and (24) of the gas piping (31) may be reduced in diameter, but at least one of the first, second, third and fourth gas pipes (21), (22), (23) and (24) may be reduced in diameter. Similarly, not both of the first and second liquid pipes (25) and (26) of the liquid piping (32) may be reduced in diameter, but at least one of the first and second liquid pipes (25) and (26) may be reduced in diameter.

The diameter (outer or inner diameter) of the liquid piping (32) may be less than the values of the liquid piping for R22 that are different from the values of FIG. 7.

More specifically, when the rated cooling capacity is 5 kW or less, the liquid piping (32) may be formed from piping having a diameter of less than 4.75 mm.

When the rated cooling capacity is larger than 5 kW and equal to or less than 18 kW, the liquid piping (32) may be formed from piping having a diameter of less than 7.92 mm.

When the rated cooling capacity is larger than 18 kW and equal to or less than 22.4 kW, the liquid piping (32) may be formed from piping having a diameter of less than 11.1 mm.

When the rated cooling capacity is larger than 22.4 kW, the liquid piping (32) may be formed from piping having a diameter of less than 13.88 mm.

Moreover, the diameter of the gas piping (31) may be less than the values of the gas piping for R22 that are different from the values of FIG. 7.

More specifically, when the rated cooling capacity is 3.2 kW or less, the gas piping (31) may be formed from piping having a diameter of less than 7.92 mm.

When the rated cooling capacity is larger than 3.2 kW and equal to or less than 5 kW, the gas piping (31) may be formed from piping having a diameter of less than 11.1 mm.

When the rated cooling capacity is larger than 5 kW and equal to or less than 9 kW, the gas piping (31) may be formed from piping having a diameter of,less than 13.88 mm.

When the rated cooling capacity is larger than 9 kW and equal to or less than 18 kW, the gas piping (31) may be formed from piping having a diameter of less than 17.05 mm.

When the rated cooling capacity is larger than 18 kW and equal to or less than 22.4 kW, the gas piping (31) may be formed from piping having a diameter of less than 23.4 mm.

When the rated cooling capacity is larger than 22.4 kW, the gas piping (31) may be formed from piping having a diameter of less than 26.18 mm.

The diameter of the respective heat transfer tubes of the indoor heat exchanger (15) and the outdoor heat exchanger (13) may also be less than the values of the heat transfer tube for R22.

More specifically, the heat transfer tube of the indoor heat exchanger (15) may be formed from a heat transfer tube having an inner diameter of less than 5.87 mm.

The heat transfer tube of the outdoor heat exchanger (13) may be formed from a heat transfer tube having an inner diameter of less than 6.89 mm.

The heat transfer tube of the outdoor heat exchanger (13) may be formed from a heat transfer tube having an inner diameter of less than 7.99 mm.

Although the aforementioned embodiment is a heat-pump air-conditioning apparatus capable of selectively conducting the cooling and heating operations, the present invention is not limited to the heat-pump air-conditioning apparatus, but may be, e.g., a cooling machine. Provided that the respective inner diameters of the liquid piping (32) and the gas piping (31) or the inner diameter ratio thereof are set according to the rated heating capacity corresponding to the rated cooling capacity, the present invention is applicable to a heating machine.

The rated cooling capacity of the present invention means the capability in the evaporator, and is not limited to the capability in the cooling operation of the air-conditioning apparatus. Note that this rated cooling capacity is the capacity that is obtained under prescribed JIS conditions (indoor dry-bulb temperature: 27° C.; indoor wet-bulb temperature: 19° C., and outdoor dry-bulb temperature: 35° C.) when the connection piping is five meters long and the difference in level between the indoor unit and the outdoor unit is 0 m.

It should be appreciated that the gas piping (31) and the liquid piping (32) are not necessarily formed from copper pipes, but may be formed from other pipes such as SUS pipes, aluminum pipes or iron pipes.

Each of the indoor heat exchanger (15) and the outdoor heat exchanger (13) is not limited to an air heat exchanger, but may be a liquid-liquid heat exchanger such as double-tube heat exchanger.

Note that the refrigerating apparatus of the present invention is not limited to a narrowly defined refrigerating apparatus, but is a refrigerating apparatus in a broad sense, including not only the aforementioned air-conditioning apparatus but also a cold-storage apparatus, a dehumidifier and the like.

When the present invention is applied to a refrigerating apparatus for long piping or an air-conditioning apparatus including a plurality of indoor units, the allowable pipe length can be increased. The present invention may include an increased number of indoor units. Accordingly, handling of the apparatus is facilitated, enabling improvement in property as a product.

When the present invention is applied to a machine for long piping or an indoor versatile machine, the allowable pipe length can be increased, and the number of indoor machines can also be increased. Accordingly, handling of the apparatus is facilitated, enabling improvement in property as a product.

INDUSTRIAL APPLICABILITY

As has been described above, the refrigerating apparatus of the present invention is useful when using an R32 single refrigerant or an R32 mixed refrigerant, and is particularly suitable as a refrigerating apparatus using synthetic oil as refrigerating machine oil.

What is claimed is:

1. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less, wherein liquid piping (32) of the refrigerant circuit (10) is formed from piping having an inner diemeter of less than 4.75 mm.

2. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less, wherein liquid piping (32) of the refrigerant circuit (10) is formed from piping having an inner diameter of 3.2 mm to 4.2 mm.

3. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less, wherein liquid piping (32) of the refrigerant circuit (10) is formed from piping having an inner diameter of 3.5 mm to 3.9 mm.

4. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 5 kW or less, wherein liquid piping (32) of the refrigerant circuit (10) is formed from piping having an inner diameter of 3.6 mm to 3.8 mm.

5. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 18 kw, wherein liquid piping (32) of the refrigerant circuit (10) is formed from piping having an inner diameter of less than 7.92 mm.

6. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 18 kW and equal to or less than 22.4 kW, wherein liquid piping (32) of the refrigerant circuit (10) is formed from piping having an inner diameter of less than 11.1 mm.

7. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kw and equal to or less than 22.4 kW, wherein liquid piping (32) of the refrigerant circuit (10) is formed from piping having an inner diameter of 5.4 mm to 7.0 mm.

8. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 22.4 kW, wherein liquid piping (32) of the refrigerant circuit (10) is formed from piping having an inner diameter of 5.7 mm to 6.7 mm.

9. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 22.4 kW, wherein liquid piping (32) of the refrigerant circuit (10) is formed from piping having an inner diameter of 6.0 mm to 6.4 mm.

10. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW, wherein liquid piping (32) of the refrigerant circuit (10) is formed from piping having an inner diameter of less than 13.88 mm.

11. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW, wherein liquid piping (32) of the refrigerant circuit (10) is formed from piping having an inner diameter of 7.5 mm to 9.8 mm.

12. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW, wherein liquid piping (32) of the refrigerant circuit (10) is formed from piping having an inner diameter of 7.8 mm to 9.5 mm.

13. A refrigerating. apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW, wherein liquid piping (32) of the refrigerant circuit (10) is formed from piping having an inner diameter of 8.1 mm to 9.1 mm.

14. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity of 3.2 kW or less, wherein gas piping (31) of the refrigerant circuit (10) is formed from piping having an inner diameter of less than 7.92 mm.

15. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 3.2 kW and equal to or less than 5 kW, wherein gas piping (31) of the refrigerant circuit (10) is formed from piping having an inner diameter of less than 11.1 mm.

16. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 5 kW and equal to or less than 9 kW, wherein gas piping (31) of the refrigerant circuit (10) is formed from piping having an inner diameter of less than 13.88 mm.

17. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 9 kw and equal to or less than 18 kW, wherein gas piping (31) of the refrigerant circuit (10) is formed from piping having an inner diameter of less than 17.05 mm.

18. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus having a rated cooling capacity that is larger than 18 kW and equal to or less than 22.4 kW, wherein gas piping (31) of the refrigerant circuit (10) is formed from piping having an inner diameter of less than 23.4 mm.

19. A refrigerating apparatus comprising a refrigerant circuit (10) that forms a refrigerating cycle using as a refrigerant a single refrigerant of R32 or a mixed refrigerant containing at least 75% by weight of R32 and includes a compressor (11) using synthetic oil as refrigerating machine oil, the refrigerating apparatus being designed to have a rated cooling capacity of more than 22.4 kW, wherein gas piping (31) of the refrigerant circuit (10) is formed from piping having an inner diameter of less than 26.18 mm.

20. A refrigerating apparatus comprising a refrigerant circuit (10) that includes a compressor (11) using synthetic oil as refrigerating machine oil and an indoor heat exchanger (15), and forms a refrigerating cycle using as a refrigerant a single refrigerant of R32 or a mixed refrigerant containing at least 75% by weight of R32, wherein a heat transfer tube of the indoor heat exchanger (15) is formed from a heat transfer tube having an inner diameter of less than 5.87 mm.

21. A refrigerating apparatus comprising a refrigerant circuit (10) that includes a compressor (11) using synthetic oil as refrigerating machine oil and an outdoor heat exchanger (13), and forms a refrigerating cycle using as a refrigerant a single refrigerant of R32 or a mixed refrigerant containing at least 75% by weight of R32, wherein a heat transfer tube of the outdoor heat exchanger (13) is formed from a heat transfer tube having an inner diameter of less than 6.89 mm.

22. A refrigerating apparatus comprising a refrigerant circuit (10) that includes a compressor (11) using synthetic oil as refrigerating machine oil and an outdoor heat exchanger (13), and forms a refrigerating cycle using as a refrigerant a single refrigerant of R32 or a mixed refrigerant containing at least 75% by weight of R32, wherein a heat transfer tube of the outdoor heat exchanger (13) is formed from a heat transfer tube having an inner diameter of less than 7.99 mm.

23. The refrigerating apparatus according to any one of claims 1 to 13, wherein the liquid piping (32) is liquid connection piping connecting an indoor unit (17) and an outdoor unit (16) to each other.

24. The refrigerating apparatus according to any one of claims 14 to 19, wherein the gas piping (31) is gas connection piping connecting an indoor unit (17) and an outdoor unit (16) to each other.

25. The refrigerating apparatus according to any one of claims 1 to 22, wherein the mixed refrigerant is an R32/R125 mixed refrigerant.

26. The refrigerating apparatus according to any one of claims 1 to 22, wherein the refrigerant is a single refrigerant of R32.

* * * * *